(12) United States Patent
Fournier et al.

(10) Patent No.: US 6,329,632 B1
(45) Date of Patent: Dec. 11, 2001

(54) METHOD AND DEVICE FOR MACHINING HOLES OR SHAPES OF VARYING PROFILE USING AN EXCIMER LASER

(75) Inventors: Gérard Albert Félix Fournier, Fleury en Biere; Joël Olivier Alfred Abel Vigneau, Champcueil, both of (FR)

(73) Assignee: Societe Nationale d'Etude et de Construction de Moteurs d'Aviation "Snecma", Paris (FR)

(*) Notice: Subject to any disclaimer, the term of this patent is extended or adjusted under 35 U.S.C. 154(b) by 0 days.

(21) Appl. No.: 09/359,811

(22) Filed: Jul. 23, 1999

(30) Foreign Application Priority Data

Jul. 30, 1998 (FR) .................................................. 98 09742

(51) Int. Cl.$^7$ .................................................. B23K 26/00
(52) U.S. Cl. .................................. 219/121.7; 219/121.61; 219/121.62; 219/121.68; 219/121.71; 219/121.8; 219/121.81; 219/121.73
(58) Field of Search ........................... 219/121.7, 121.61, 219/121.62, 121.68, 121.71, 121.8, 121.81, 121.73

(56) References Cited

U.S. PATENT DOCUMENTS

| | | | |
|---|---|---|---|
| 5,016,149 | * | 5/1991 | Tanaka et al. ........................ 362/259 |
| 5,585,019 | * | 12/1996 | Gu et al. .......................... 219/121.73 |
| 5,656,186 | * | 8/1997 | Mourou et al. .................. 219/121.69 |
| 6,034,349 | * | 3/2000 | Ota ................................... 219/121.73 |

* cited by examiner

Primary Examiner—M. Alexander Elve
(74) Attorney, Agent, or Firm—Oblon, Spivak, McClelland, Maier & Neustadt, P.C.

(57) ABSTRACT

A device for machining a hole or a shape of varying profile in a mechanical workpiece using an excimer laser comprises a screen having an aperture of predetermined shape disposed between the excimer laser and a device for focussing the laser beam, the screen being movable in a plane perpendicular to the laser beam. Control means is provided for automatically controlling displacement of the screen in real time while the hole is being machined in the workpiece, the control being effected as a function of the number of pulses emitted by the excimer laser. As an alternative, the screen may be replaced by a diaphragm comprising variable-aperture shutters.

8 Claims, 2 Drawing Sheets

Type of hole obtained

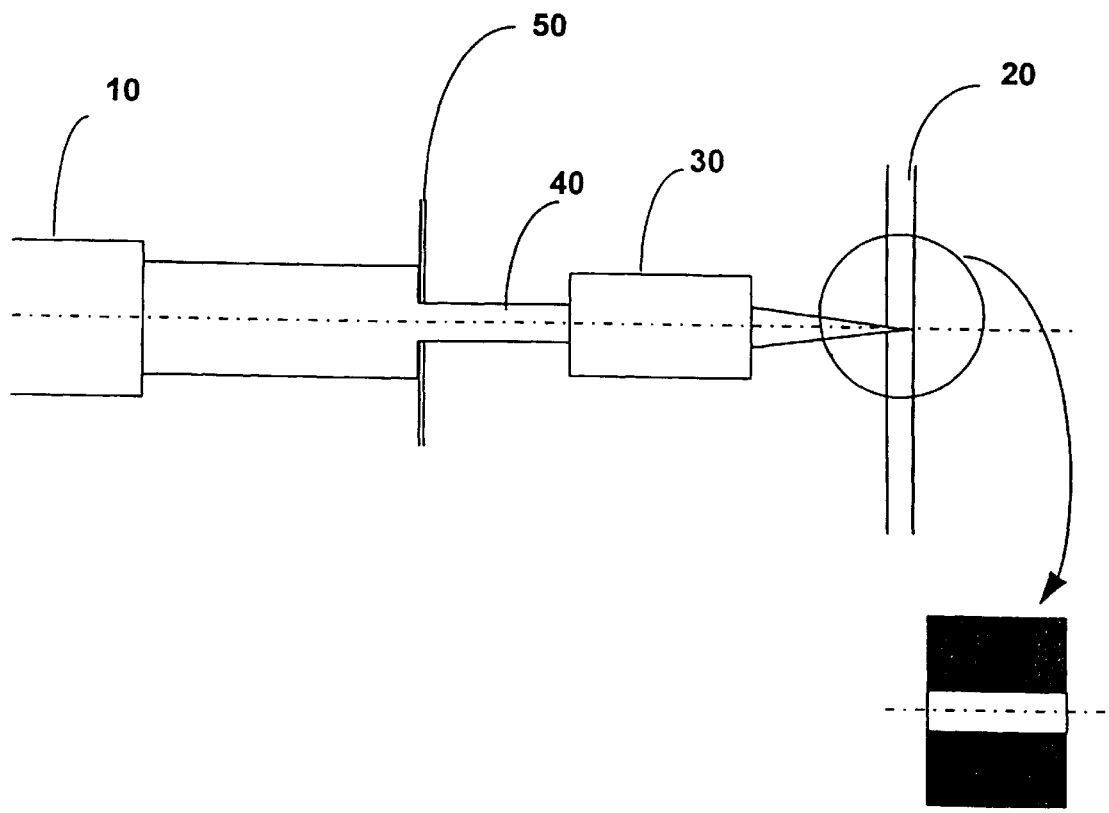
Type of hole
obtained
Fig : 1

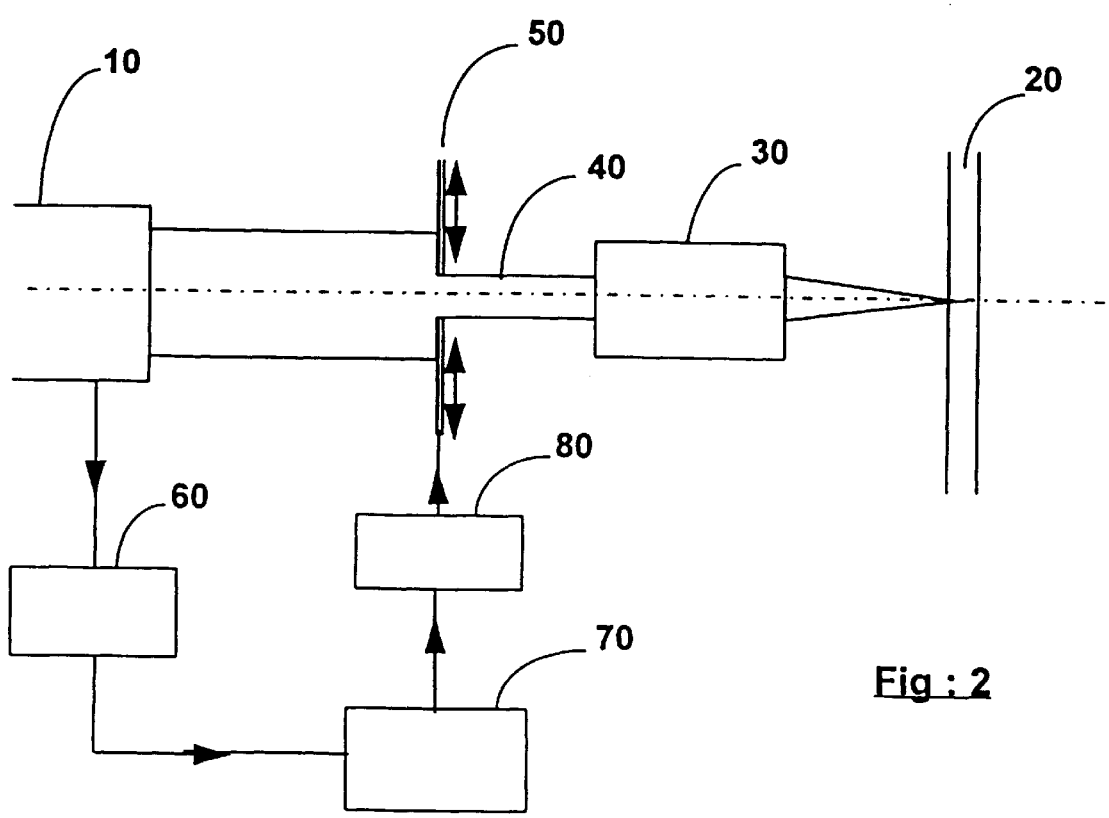
Fig : 2
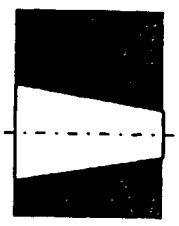
Fig : 3a
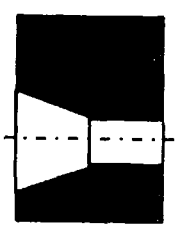
Fig : 3b
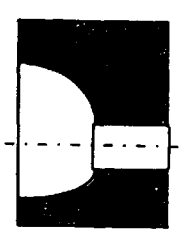
Fig : 4a
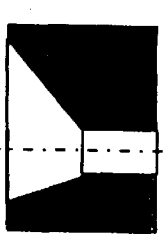
Fig : 4b

METHOD AND DEVICE FOR MACHINING HOLES OR SHAPES OF VARYING PROFILE USING AN EXCIMER LASER

BACKGROUND OF THE INVENTION

1. Field of the Invention

The invention relates to a method and device for machining holes or shapes of varying profile in a mechanical workpiece using an excimer laser. It is applicable in particular in aeronautical engineering to the piercing of cooling holes in the vanes and combustion chamber of a turbine engine.

2. Summary of the Prior Art

It is known to machine holes of varying profile using an electro-discharge machining (or EDM) technique. This technique has the major disadvantage of requiring the use of an electrode having a shape which is identical to the shape required for the hole that is to be made, this electrode itself having to be machined. Furthermore, this machining process is too slow.

The piercing of holes of varying profile using a laser beam and means for rotating the beam about the generatrix of a cone is also known, such as from French patent No. 2637524. The hole produced is funnel-shaped, but the dimensions of the conical part and the length of the cylindrical part downstream of the conical part are difficult to control in an industrial process.

SUMMARY OF THE INVENTION

It is an object of the invention to provide a method and a device for machining holes or shapes of varying profile that allows the drawbacks of the known methods and devices to be overcome.

For this purpose, the invention makes use of an excimer laser. Machining is performed without relative displacement of the laser beam with respect to the mechanical workpiece. Instead, the beam emitted by the excimer laser is shaped by inserting, in an unfocussed part of the beam path, a diaphragm or a screen which has an aperture of predetermined shape so that only a beam whose cross section is the desired size and shape is allowed to pass.

More particularly, according to one aspect of the invention, a device for machining a hole or a shape of any cross section in a mechanical workpiece comprises an excimer laser which emits a beam in the form of pulses, a device for focussing said beam, and a screen disposed between the excimer laser and the beam focussing device, said screen being provided with an aperture having a predetermined shape and said screen being movable in a plane perpendicular to the laser beam.

Alternatively, a diaphragm comprising variable-aperture shutters may be used in place of the screen.

According to a further aspect of the invention, a method of machining holes or shapes of varying profile in a mechanical workpiece using an excimer laser comprises the steps of emitting a laser beam in the form of pulses toward the mechanical workpiece that is to be machined, blocking off part of the laser beam to select a predetermined cross section of said beam, and automatically varying the cross section of the laser beam in real time during machining according to the profile of the hole that is to be made in the workpiece and in accordance with a predetermined variation law.

Preferred features and advantages of the invention will become apparent from the following description of the preferred embodiments, given by way of non limiting example, with reference to the appended drawings.

BRIEF DESCRIPTION OF THE DRAWINGS

FIG. 1 is a diagram of one embodiment of a device in accordance with the invention for piercing cylindrical or shaped holes in a workpiece.

FIG. 2 is a diagram of a second embodiment of a device in accordance with the invention for piercing holes of varying profile.

FIGS. 3a and 3b are sections showing two examples of holes of varying profile which can be obtained by uniformly varying the shutter aperture of the diaphragm in a device in accordance with the invention.

FIGS. 4a and 4b are sections showing two examples of holes of varying profile which can be obtained by independently controlling several shutters of the diaphragm or by displacement of the center of the screen in different devices in accordance with the invention.

DESCRIPTION OF THE PREFERRED EMBODIMENTS

The device depicted in FIG. 1 comprises a source 10 of excimer laser radiation emitting a beam of radiation in the form of pulses in the direction of a mechanical workpiece 20 that is to be machined, a device 30 for focussing the laser beam mounted in the path of the beam 40 so as to focus this beam onto the workpiece 20, and a screen or diaphragm 50 inserted between the source 10 and the focussing device 30. The screen has an aperture of predetermined shape arranged in the unfocussed part of the path of the laser beam 40. Inserting a screen in the path of the beam before it is focussed makes it possible to block off part of the beam and thereby shape the part of the beam which is not blocked off so as to allow only a beam whose cross section is the desired size and shape to pass.

The device depicted in FIG. 2 comprises the same components as the device described in conjunction with FIG. 1, and additionally comprises means for controlling the displacement of the screen or the deformation of the diaphragm so that it is possible during machining to vary the position of the screen or the aperture of the diaphragm in a plane that is perpendicular to the axis of the laser beam. The control means comprise a device 60 for counting the pulses emitted by the excimer laser 10 connected to a control device 70 designed to control mechanical means 80 for adjusting the displacement of the screen or the aperture of the diaphragm as a function of the number of pulses emitted by the excimer laser. The displacement of the screen or the adjustment of the diaphragm is performed in real time as a function of time or of the number of pulses emitted by the laser, which means that zones of the surface of the mechanical workpiece are illuminated by the laser beam for different lengths of time. The depth of machining by the laser beam at these zones is therefore a function of the time for which these zones are illuminated or of the number of laser pulses that impinge on these zones. Displacing the screen or adjusting the diaphragm makes it possible to obtain holes or shapes of varying profile by virtue of varying the focal spot obtained by the interaction of the laser beam with the mechanical workpiece so that the machined depth depends on the duration of this interaction at each point on the surface of the workpiece.

By way of example, it is possible to makes holes whose cross section decreases uniformly according to a pre-established law, as depicted in FIGS. 3a and 3b.

To vary the position of the screen, the screen may, for example, be mounted on a carriage that can move in a plane perpendicular to the axis of the laser beam. The carriage may be controlled automatically, such as by a stepping motor wherein rotation is indexed to the number of pulses emitted by the laser in accordance with a program pre-established by a computer.

The screen may be replaced by a diaphragm with variable-aperture shutters. In this case, the means for controlling the displacement of the screen are replaced by means for controlling the adjustment of the diaphragm, it being possible for said control means to act on each shutter independently. The means for controlling the adjustment of the diaphragm comprise a control device tasked with overseeing the opening or closing of the diaphragm so as to vary the cross section of the laser beam and therefore the machined shape.

The variation in the cross section of the beam is effected automatically in accordance with a predetermined variation law. The adjustment of the diaphragm is effected in real time while the hole is being pierced. Progressive closure of the diaphragm leads to holes of varying profile, having a cross section that decreases in the direction of the depth of the hole. For example, the holes may be conical or funnel-shaped, and the cross section of the holes may be circular, square, polygonal, or some other shape, depending on the shape of the diaphragm.

Examples of holes obtained by independent control of several shutters of the diaphragm or by displacing a screen are depicted in FIGS. 4a and 4b.

The control device may comprise a stepping motor wherein the rotation is indexed to the number of pulses emitted by the laser, in accordance with a pre-established program in a computer, the motor acting through a lever or a ring (not depicted) to control the diaphragm.

The machining device of the invention also makes it possible, in the case of cylindrical holes, to size the hole which is to be produced by tailoring the aperture of the diaphragm so as to produce a cylindrical hole of smaller diameter than the diameter desired and then, when the workpiece has been pierced, opening the diaphragm as a fiction of the number of laser pulses so as to obtain the desired hole cross section. Sizing in this way makes it possible to improve the dimensional accuracy of the hole produced and to eliminate the deposition of material on the walls of the hole due to the machining.

What is claimed is:

1. A device for machining a hole or a shape of varying profile in a mechanical workpiece using an excimer laser, said device comprising an excimer laser which emits a beam in the form of pulses, a device for focussing said beam, and a screen disposed between the excimer laser and the beam focussing device, said screen being provided with an aperture having a predetermined shape and said screen being movable in a plane perpendicular to the laser beam.

2. A device as claimed in claim 1, including means for controlling the displacement of said screen in said plane perpendicular to the laser beam, whereby the displacement can be effected in real time while the hole is being machined in the workpiece.

3. A device for machining a hole or a shape of varying profile in a mechanical workpiece using an excimer laser, said device comprising an excimer laser which emits a beam in the form of pulses, a device for focussing said beam, and a diaphragm comprising variable-aperture shutters disposed between said excimer laser and the beam focussing device.

4. A device as claimed in claim 3, including means for automatically controlling the aperture of the diaphragm in real time while the hole is being machined in the workpiece.

5. A device as claimed in claim 4, wherein said means for controlling the aperture of said diaphragm act on each of said variable-aperture shutters independently.

6. A device as claimed in claim 4, wherein said means for controlling the aperture of said diaphragm includes a device for counting the pulses emitted by said excimer laser.

7. A device as claimed in claim 6, wherein said means for controlling the aperture of said diaphragm further includes mechanical means for adjusting the aperture cross-section of the diaphragm, and a control device arranged to control said mechanical means for adjusting the aperture cross-section of the diaphragm as a function of the number of pulses emitted by said excimer laser.

8. A device as claimed in claim 7, wherein said control device comprises a stepping motor whose rotational speed is indexed to the number of pulses emitted by said excimer laser.

* * * * *